US012652086B2

(12) United States Patent
El-Keyi et al.

(10) Patent No.: US 12,652,086 B2
(45) Date of Patent: Jun. 9, 2026

(54) INTERFERENCE-AWARE DIMENSION REDUCTION VIA ORTHONORMAL BASIS SELECTION

(71) Applicant: Telefonaktiebolaget LM Ericsson (publ), Stockholm (SE)

(72) Inventors: Amr El-Keyi, Kanata (CA); Chandra Bontu, Nepean (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 400 days.

(21) Appl. No.: 18/259,323

(22) PCT Filed: Jan. 15, 2021

(86) PCT No.: PCT/IB2021/050310
§ 371 (c)(1),
(2) Date: Jun. 26, 2023

(87) PCT Pub. No.: WO2022/153084
PCT Pub. Date: Jul. 21, 2022

(65) Prior Publication Data
US 2024/0063856 A1      Feb. 22, 2024

(51) Int. Cl.
H04B 7/0456 (2017.01)
H04B 7/0452 (2017.01)

(52) U.S. Cl.
CPC ........... H04B 7/046 (2013.01); H04B 7/0452 (2013.01)

(58) Field of Classification Search
CPC .... H04B 7/046; H04B 7/0452; H04B 7/0854; H04B 7/086; Y02D 30/70
See application file for complete search history.

(56) References Cited

U.S. PATENT DOCUMENTS

2013/0088986 A1      4/2013  Xiao et al.
2014/0098689 A1*     4/2014  Lee ....................... H04W 24/08
                                                                        370/252

(Continued)

FOREIGN PATENT DOCUMENTS

WO       2019/220188 A1      11/2019
WO       2020/161526 A1       8/2020

OTHER PUBLICATIONS

International Search Report and Written Opinion dated Sep. 29, 2021 issued in PCT Application No. PCT/IB2021/050310 filed Jan. 15, 2021, consisting of 13 pages.

(Continued)

*Primary Examiner* — Tejis Daya
(74) *Attorney, Agent, or Firm* — Sonoda & Kobayashi Intellectual Property Law; Sarvajit S. Patil

(57)                ABSTRACT

A method and network node for interference-aware dimension reduction via orthonormal basis selection are disclosed. According to one aspect, a method includes determining a beamformer for each wireless device (WD), each beamformer being based at least in part on an interference covariance matrix; determining a power in each dimension reduction basis vector based at least in part on the determined beamformers; and selecting a subset of the dimension reduction basis vectors based on the determined power. A number of selected dimension reduction basis vectors is less than a number of antenna elements of the network node. The method also includes multiplying a received signal vector by a dimension reduction matrix having as rows the selected subset of the dimension reduction basis vectors. The multiplying results in a reduced signal vector having a dimension equal to the number of selected rows of the dimension reduction matrix.

22 Claims, 8 Drawing Sheets

(56) References Cited

U.S. PATENT DOCUMENTS

2019/0036580 A1* 1/2019 Zhang .................. H04B 7/0658
2019/0349035 A1* 11/2019 Yang ...................... H04B 7/066

OTHER PUBLICATIONS

Fredrik Rusek et al., Scaling Up Mimo; IEEE Signal Processing
Magazine, Jan. 2013, consisting of 21 pages.
Akbar M. Sayeed, Deconstructing Multiantenna Fading Channels;
IEEE Transactions on Signal Processing, vol. 50, No. 10, Oct. 2002,
consisting of 17 pages.
Akbar Sayeed et al., Beamspace MIMO for High-Dimensional
Multiuser Communication at Millimeter-Wave Frequencies; IEEE
Global Communications Conference—Globecom 2013—Wireless
Communications Symposium, consisting of 6 pages.

* cited by examiner

INTERFERENCE-AWARE DIMENSION REDUCTION VIA ORTHONORMAL BASIS SELECTION

CROSS-REFERENCE TO RELATED APPLICATIONS

This application is a Submission Under 35 U.S.C. § 371 for U.S. National Stage Patent Application of International Application Number: PCT/IB2021/050310, filed Jan. 15, 2021 entitled "INTERFERENCE-AWARE DIMENSION REDUCTION VIA ORTHONORMAL BASIS SELECTION," the entirety of which is incorporated herein by reference.

TECHNICAL FIELD

This disclosure relates to wireless communication and in particular, to interference-aware dimension reduction via orthonormal basis selection.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs.

Massive multiple input multiple output (MIMO) introduces advantages to 5G wireless communication systems. MIMO is a method for multiplying the capacity of over the air (OTA) communications using multiple transmitting and receiving antennas. Employing multiple antennas at a network node and the WD enables achievement of spatial selectivity via beamforming. In beamforming, signals at certain angles experience constructive interference while others experience destructive interference. As a result, the received signal to interference-plus-noise ratio (SINR) can be significantly improved.

Massive MIMO introduces several challenges to practical communication systems as it significantly increases the complexity of wireless transceivers due to the high dimension of the spatial signal space. Fortunately, practical massive MIMO communication channels are expected to have low rank as communication occurs in a low-dimensional subspace of the high-dimensional spatial signal space.

Several dimension reduction techniques have been utilized to exploit the reduced rank of the signal subspace where a set of basis vectors are used to reduce the number of elements of the channel vector, and hence, reduce the complexity of subsequent signal processing operations.

Two dimensional (2D) spatial discrete Fourier transform (S-DFT) beam space bases have been widely used as the dimension reduction bases for uniformly spaced 2D polarized arrays, such as shown in FIG. 1, as they match the spatial signature of propagating plane waves. Several techniques have been proposed for selecting the dimension reduction basis. These techniques utilize the estimated power of the desired signal in each S-DFT basis direction to select a reduced-dimension subspace that maximizes the desired signal power contained in the reduced subspace.

Current dimension reduction techniques rely on maximizing the desired signal power contained in the reduced-dimension subspace. However, in dense deployment scenarios where inter-cell interference might be large, the subspace containing the maximum desired signal power might significantly overlap with that containing out-of-cell interference.

SUMMARY

Some embodiments advantageously provide a method and system for interference-aware dimension reduction via orthonormal basis selection.

Some embodiments use additional information about out-of-cell interference in designing dimension reduction transformations that not only focus the desired signal power in the reduced dimensions but also reduces the interference power. This is achieved by using the optimal receive beamformer for each user that maximizes the output signal to interference plus noise ratio (SINR) to select the dimension reduction basis from a set of fixed orthonormal bases. As a result, some embodiments provide significant performance gain in deployment scenarios with heavy or medium load in which out-of-cell interference may be a limiting factor for user capacity.

Some embodiments utilize the covariance matrix of out-of-cell interference as well as the desired signal power to compute the dimension reduction basis. Some embodiments provide significant gain in cell throughput compared to legacy dimension reduction methods that utilize only the desired signal power to compute the dimension reduction basis.

According to one aspect, a method in a network node configured to perform interference-aware dimension reduction is provided. The method includes determining a beamformer for each of a plurality of wireless devices, WDs, each beamformer being based at least in part on an interference covariance matrix of interference plus noise. The method includes determining a power in each dimension reduction basis vector of a plurality of dimension reduction basis vectors based at least in part on the determined beamformers. The method further includes selecting a subset of the dimension reduction basis vectors, the selecting being based at least in part on the determined powers, a number of selected dimension reduction basis vectors being less than a number of antenna elements of the network node. The method also includes multiplying a received signal vector by a dimension reduction matrix, the received signal vector having a dimension equal to the number of antenna elements of the network node, the dimension reduction matrix having as rows the selected subset of the dimension reduction basis vectors, the multiplying resulting in a reduced signal vector having a dimension equal to the number of selected rows of the dimension reduction matrix.

According to this aspect, in some embodiments, the dimension reduction basis vectors are selected from the columns of a spatial discrete Fourier transform matrix. In some embodiments, the method includes processing and decoding the reduced signal vector to extract information received from each WD of the plurality of WDs. In some embodiments, the beamformer for a WD is determined based at least in part on a product of an inverse of the interference covariance matrix and a channel vector corresponding to a channel between the WD and the network node. In some embodiments, the beamformer for a WD is determined based at least in part on a generalized eigen value decomposition of the interference covariance matrix and the covariance matrix of the channel between the WD and the network node. In some embodiments, selecting the dimension reduction basis vectors includes selecting the dimension reduction basis vectors that yield a higher total power than any other set having the same number of dimension reduction basis vectors. In some embodiments, selecting the dimension reduction basis vectors includes selecting the dimension reduction basis vectors corresponding to a minimum number of dimension reduction basis vectors having a total power greater than a predetermined fraction of the total power in all the basis vectors. In some embodiments, selecting the dimension reduction basis vectors includes selecting dimension reduction basis vectors each having a power greater than a threshold. In some embodiments, the interference covariance matrix is determined for each sub band of a plurality of sub bands. In some embodiments, determining a power in each dimension reduction basis vector is based at least in part on an inner product between the determined beamformers and the dimension reduction basis vector. In some embodiments, the plurality of WDs are co-scheduled in time and frequency.

According to another aspect, a network node is configured to perform interference-aware dimension reduction. The network node includes processing circuitry configured to determine a beamformer for each of a plurality of wireless devices, WDs, each beamformer being based at least in part on an interference covariance matrix of interference plus noise; determine a power in each dimension reduction basis vector of a plurality of dimension reduction basis vectors based at least in part on the determined beamformers; select a subset of the dimension reduction basis vectors, the selecting being based at least in part on the determined powers, a number of selected dimension reduction basis vectors being less than a number of antenna elements of the network node; and multiply a received signal vector by a dimension reduction matrix, the received signal vector having a dimension equal to the number of antenna elements of the network node, the dimension reduction matrix having as rows the selected subset of the dimension reduction basis vectors, the multiplying resulting in a reduced signal vector having a dimension equal to the number of selected rows of the dimension reduction matrix.

According to this aspect, in some embodiments, the dimension reduction basis vectors are selected from the columns of a spatial discrete Fourier transform matrix. In some embodiments, the processing circuitry is further configured to decode the reduced signal vector to extract information received from each WD of the plurality of WDs. In some embodiments, the beamformer for a WD is determined based at least in part on a product of an inverse of the interference covariance matrix and a channel vector corresponding to a channel between the WD and the network node. In some embodiments, the beamformer for a WD is determined based at least in part on a generalized eigen value decomposition of the interference covariance matrix and the covariance matrix of the channel between the WD and the network node. In some embodiments, selecting the dimension reduction basis vectors includes selecting the dimension reduction basis vectors that yield a higher total power than any other set having the same number of dimension reduction basis vectors. In some embodiments, selecting the dimension reduction basis vectors includes selecting the dimension reduction basis vectors corresponding to a minimum number of dimension reduction basis vectors having a total power greater than a predetermined fraction of the total power in all the basis vectors. In some embodiments, selecting the dimension reduction basis vectors includes selecting dimension reduction basis vectors each having a power greater than a threshold. In some embodiments, the interference covariance matrix is determined for each sub band of a plurality of sub bands. In some embodiments, determining a power in each dimension reduction basis vector is based at least in part on an inner product between the determined beamformers and the dimension reduction basis vector.

According to another aspect, a computer program is configured to cause a processor to perform any of the methods disclosed herein.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
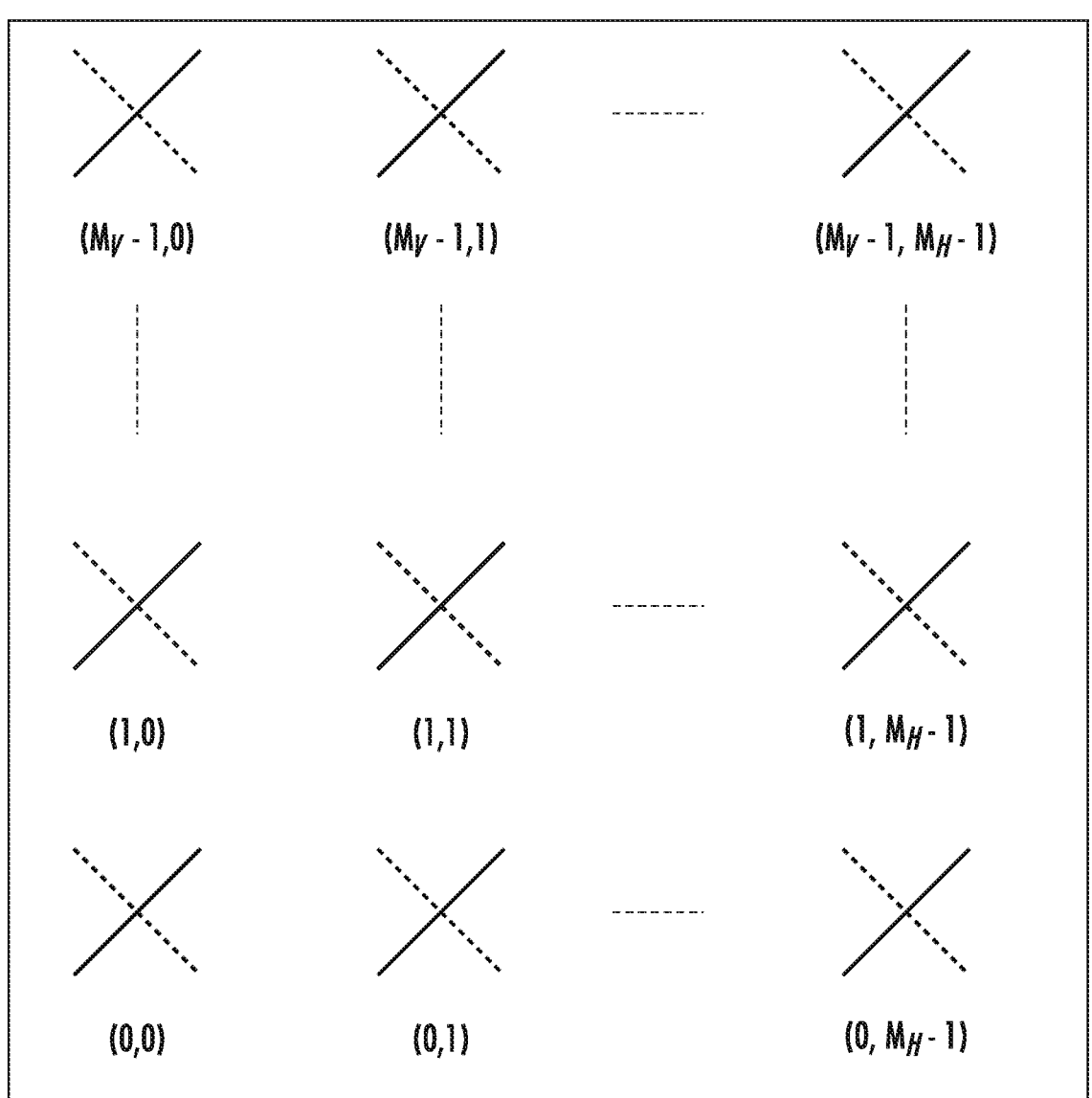
FIG. 1 is an illustration of a two-dimensional array of dual-polarized antenna elements.

Before describing in detail example embodiments, it is noted that the embodiments reside primarily in combinations of apparatus components and processing steps related to interference-aware dimension reduction via orthonormal basis selection. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 2:
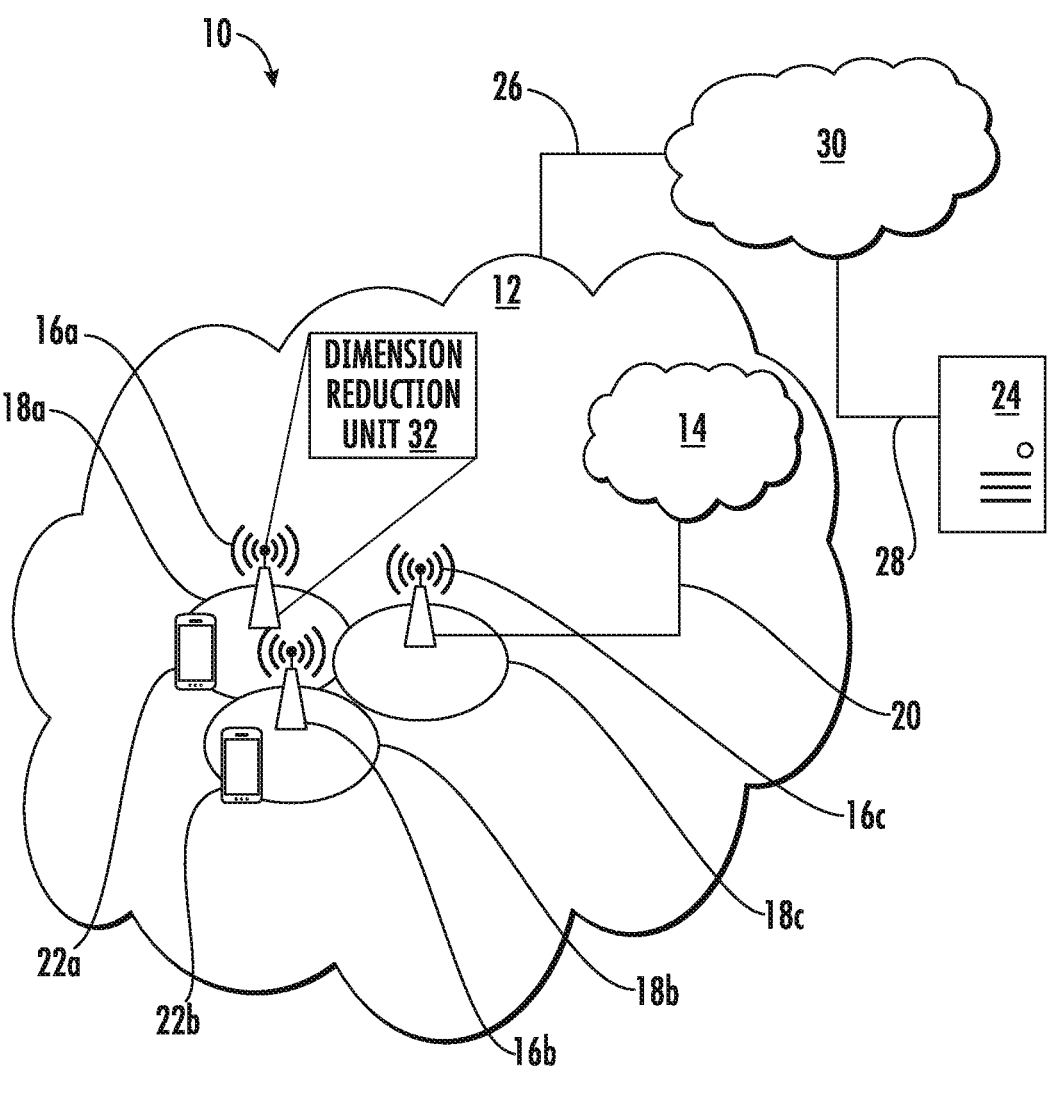
FIG. 2 is a schematic diagram of an example network architecture illustrating a communication system connected via an intermediate network to a host computer according to the principles in the present disclosure.

Returning now to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NB s, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a dimension reduction unit 32 which is configured to perform interference-aware dimension reduction according to principles set forth herein.

Example implementations, in accordance with an embodiment, of the WD 22, network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The radio interface 62 includes beamformer circuitry 63 and an antenna array 66. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include dimension reduction unit 32 configured to perform interference-aware dimension reduction via orthonormal basis selection.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22.

Figure 3:
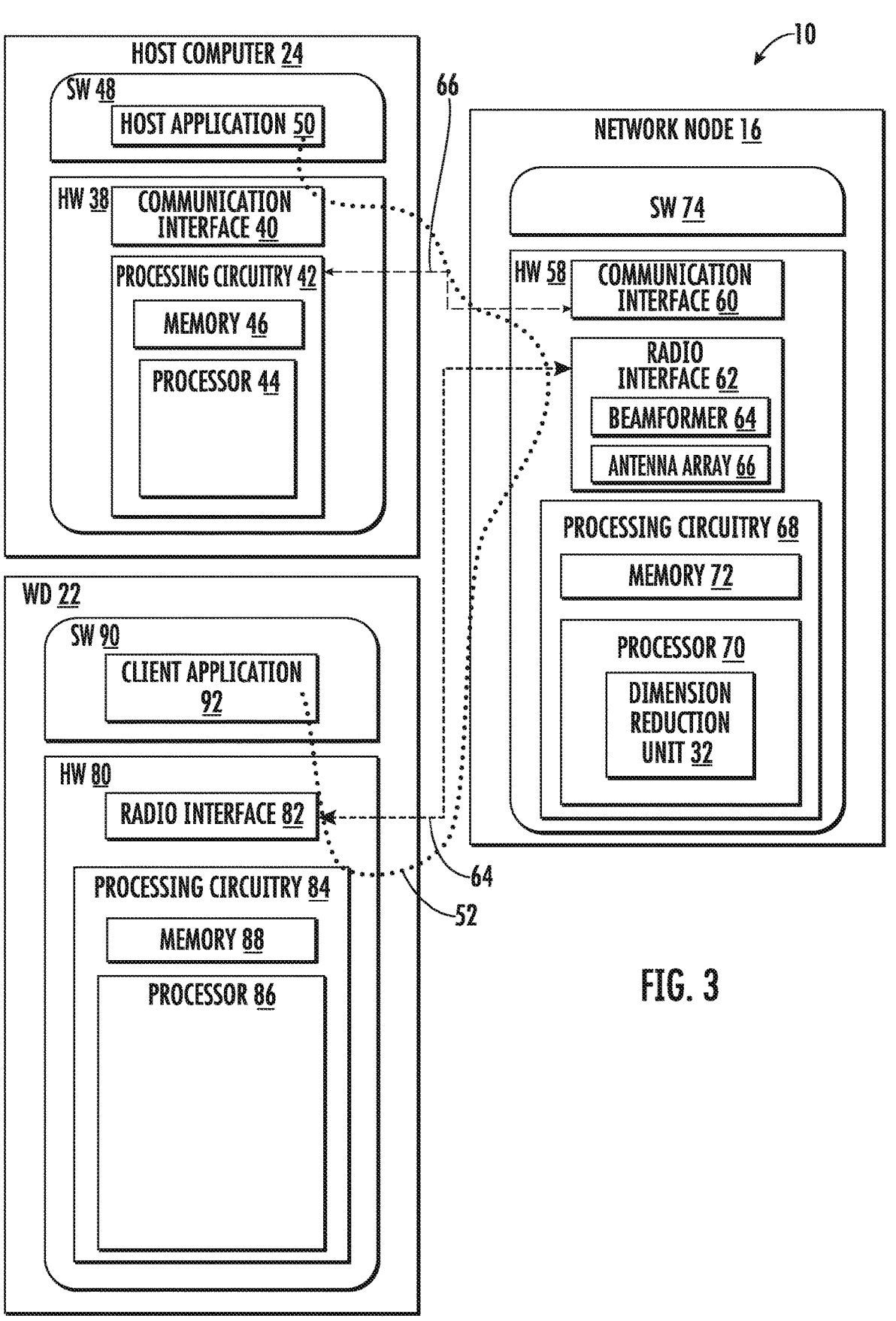
FIG. 3 is a block diagram of a network node in communication with a wireless device over an at least partially wireless connection according to some embodiments of the present disclosure.

In some embodiments, the inner workings of the network node 16, WD 22, and host computer 24 may be as shown in FIG. 3 and independently, the surrounding network topology may be that of FIG. 2.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors, etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as the dimension reduction unit 32 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 4:
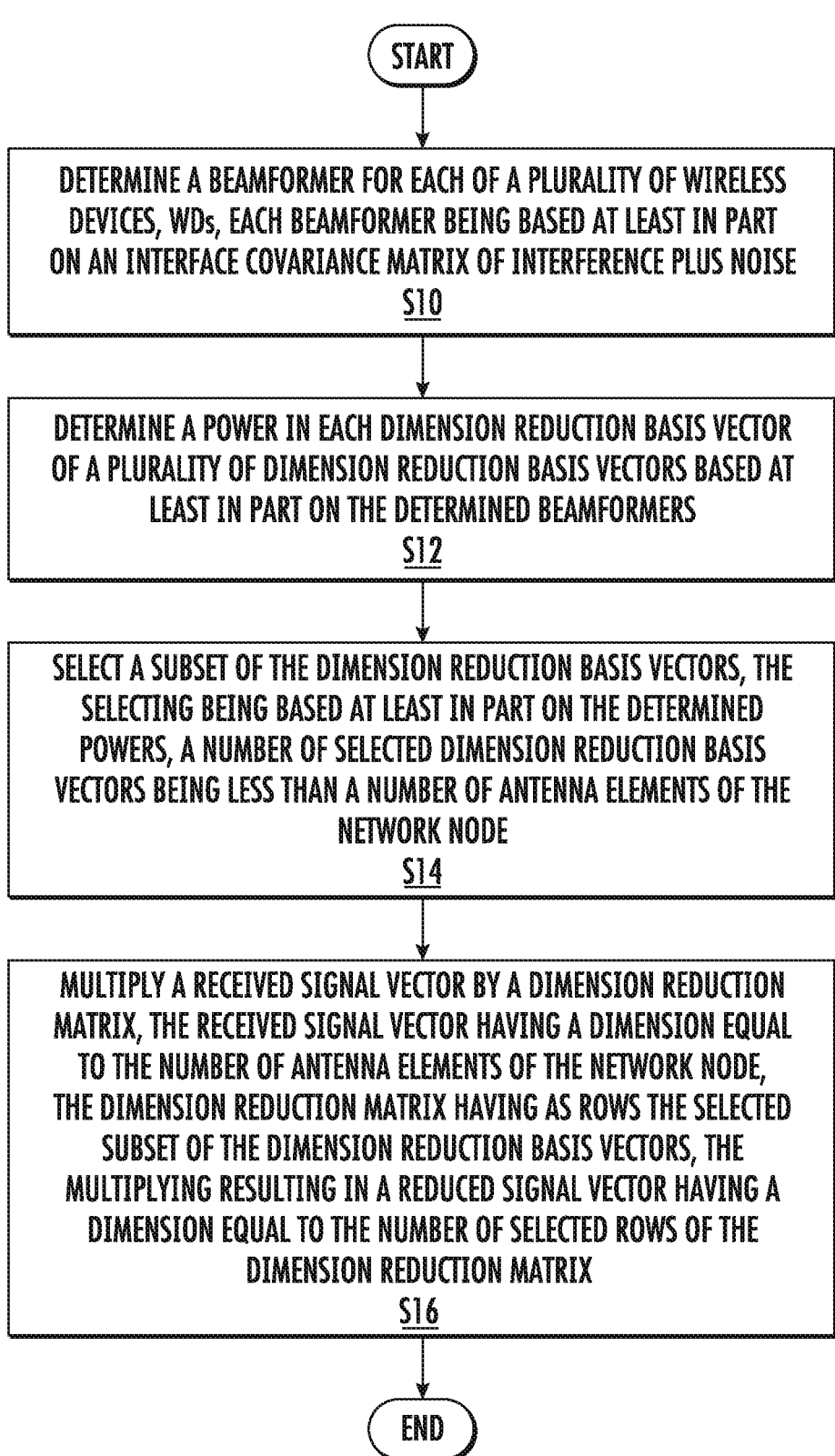
FIG. 4 is a flowchart of an example process of interference-aware dimension reduction via orthonormal basis selection according to principles set forth herein.

FIG. 4 is a flowchart of an example process for interference-aware dimension reduction via orthonormal basis selection in accordance with principles of the present disclosure. One or more blocks described herein may be performed by one or more elements of network node 16 such as by one or more of processing circuitry 68 (including the dimension reduction unit 32), processor 70, radio interface 62 and/or communication interface 60. Network node 16 such as via processing circuitry 68 and/or processor 70 and/or radio interface 62 and/or communication interface 60 is configured to determine a beamformer for each of a plurality of wireless devices, WDs, each beamformer being based at least in part on an interference covariance matrix of interference plus noise (Block S10). The process also includes determining a power in each dimension reduction basis vector of a plurality of dimension reduction basis vectors based at least in part on the determined beamformers (Block S12). The process further includes selecting a subset of the dimension reduction basis vectors, the selecting being based at least in part on the determined powers, a number of selected dimension reduction basis vectors being less than a number of antenna elements of the network node (Block S14). The process also includes multiplying a received signal vector by a dimension reduction matrix, the received signal vector having a dimension equal to the number of antenna elements of the network node, the dimension reduction matrix having as rows the selected subset of the dimension reduction basis vectors, the multiplying resulting in a reduced signal vector having a dimension equal to the number of selected rows of the dimension reduction matrix (Block S16).

Having described the general process flow of arrangements of the disclosure and having provided examples of hardware and software arrangements for implementing the processes and functions of the disclosure, the sections below provide details and examples of arrangements for interference-aware dimension reduction via orthonormal basis selection.

Consider a base station employing the 2-dimensional polarized array as shown in FIG. 1. Let $M_V$ and $M_H$ denote the number of rows and columns of the 2-dimensional antenna array, respectively. The total number of antenna elements is then given by $M=2M_V M_H$. Define the $M_V \times M_H \times 2$ multi-dimensional matrix $H_i(t,f)$ associated with the $i^{th}$ WD such that the (m,n,p) element of $H_i(t)$ is the coefficient of the channel to antenna element in row m, column n and polarization p at time instant t and frequency f, where m=1, ..., $M_V$, n=1, ..., $M_H$, and p=0, 1 for dual polarization. Furthermore, write the M×1 full channel vector associated with WD i as:

$$h_i(f, t) = \left[ h_i^{(0)^T}(f, t), h_i^{(1)^T}(f, t) \right]^T$$

where $(\bullet)^T$ and $(\bullet)^H$ denote the vector transpose and Hermitian transpose operators, respectively, and $$h_i^{(p)}(f, t)$$

is the $M_V M_H \times 1$ vector containing the coefficients of the channel associated with the antennas with polarization p, and $$h_i^{(p)}(f, t)$$

can be obtained by applying the vectorization operator (that stacks the columns of a 2-dimensional matrix on top of each other) to the two-dimensional sub-matrix of $H_i(f,t)$ associated with polarization p.

Consider the uplink transmission slot where the M×1 received signal vector by the base station at time instant t and frequency f can be written as:

$$y(f, t) = \sum_{i=1}^{K} h_i(f, t) x_i(f, t) + I(f, t) + n(f, t)$$

where K is the number of WDs that are co-scheduled on frequency f at time instant t, $x_i(f,t)$ is the transmitted signal by WD i, I(f,t) is M×1 vector containing the received interference and n(f,t) is the received noise vector. The base station employs dimension reduction on the received signal vector y(f,t) to reduce its dimension to R where K≤R<M, to reduce the complexity of decoding the transmitted signals by the K WDs.

Figure 5:
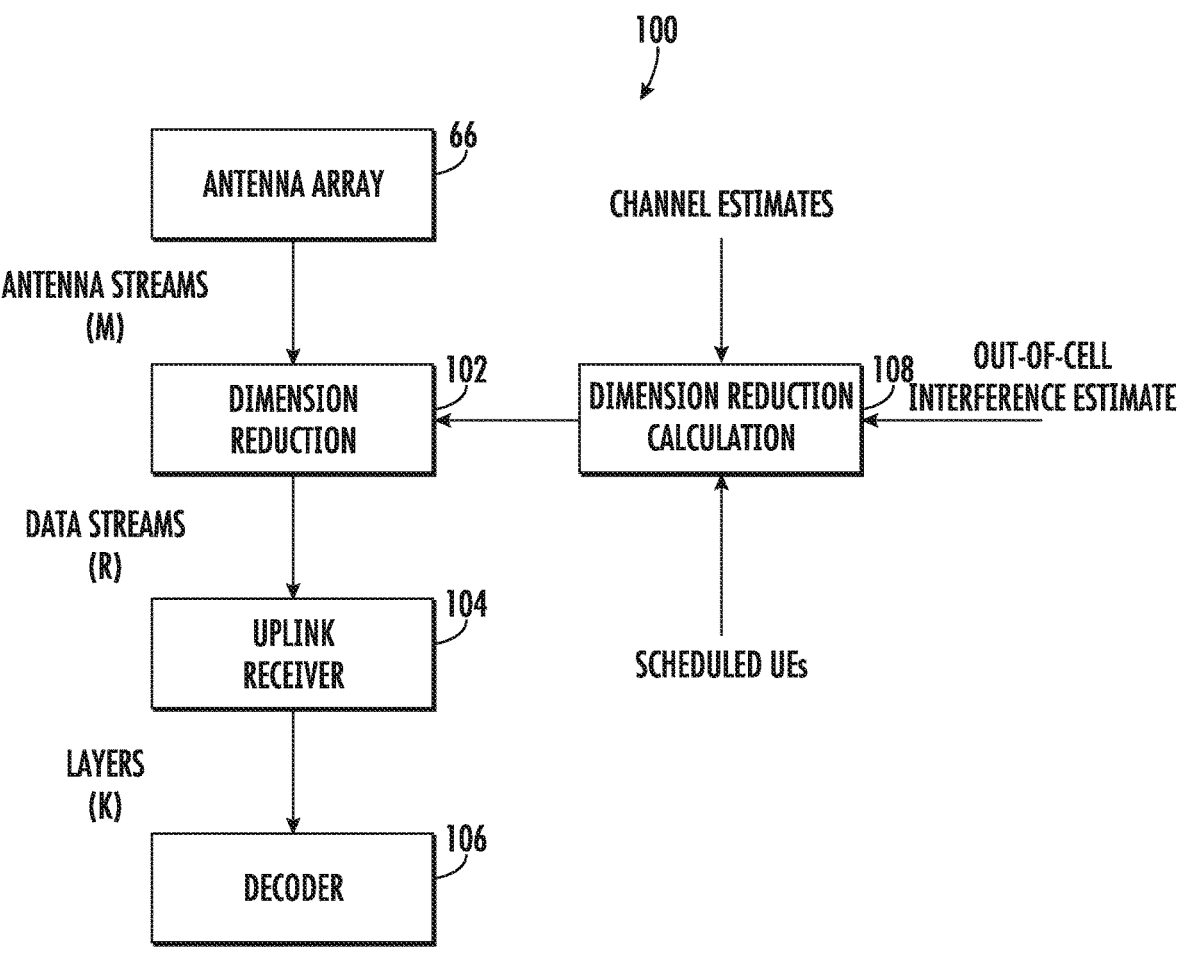
FIG. 5 is a block diagram of an uplink receiving system employing interference-aware reduction via orthonormal basis selection according to principles set forth herein.

FIG. 5 shows a block diagram of a system 100 with dimension reduction 102 where the received signal y(f,t) is transformed to reduce its dimensionality from M to R. The reduced dimension signal may then be processed by the uplink receiver 104 and decoder 106 to extract the transmitted signals by the K co-scheduled WDs. The dimension reduction basis may be calculated by the dimension reduction calculator 108 using the estimates of the full-dimension channels of the K co-scheduled users $$\{h_i(f, t)\}_{i=1}^{K}$$

as well as the estimates of the out-of-cell interference covariance.

Dimension reduction is typically implemented by multiplying the received signal vector by the R×M matrix T(f,t) where $T(f,t)T^H(f,t)=I_R$ where $I_R$ is the R×R identity matrix. In some embodiments, the rows of the matrix T(f,t) are selected from the rows of the full dimension orthonormal M×M two-dimensional spatial discrete Fourier transform (2D-SDFT) matrix B. For example, for the two-dimensional $M_V×M_H×2$ polarized array, the matrix B corresponding to the basis of the 2D-SDFT Beam space transformation is given by $$B = I_2 \otimes D_H \otimes D_V$$

where $D_H$ and $D_V$ are $M_H×M_H$ and $M_V×M_V$ DFT matrices and the (u,v) element of $D_X$ is given by $$\frac{1}{\sqrt{M_X}}e^{j\frac{2\pi uv}{M_X}} \text{ where } u, v = 1, \dots, M_X \text{ and } X \in \{H, V\}.$$

Consider two methods for selecting the dimension reduction basis that take into account the effect of interference. In the first method, the dimension reduction basis can be different for each subband whereas the second method uses the same beam reduction basis for all the subbands.

Figure 6:
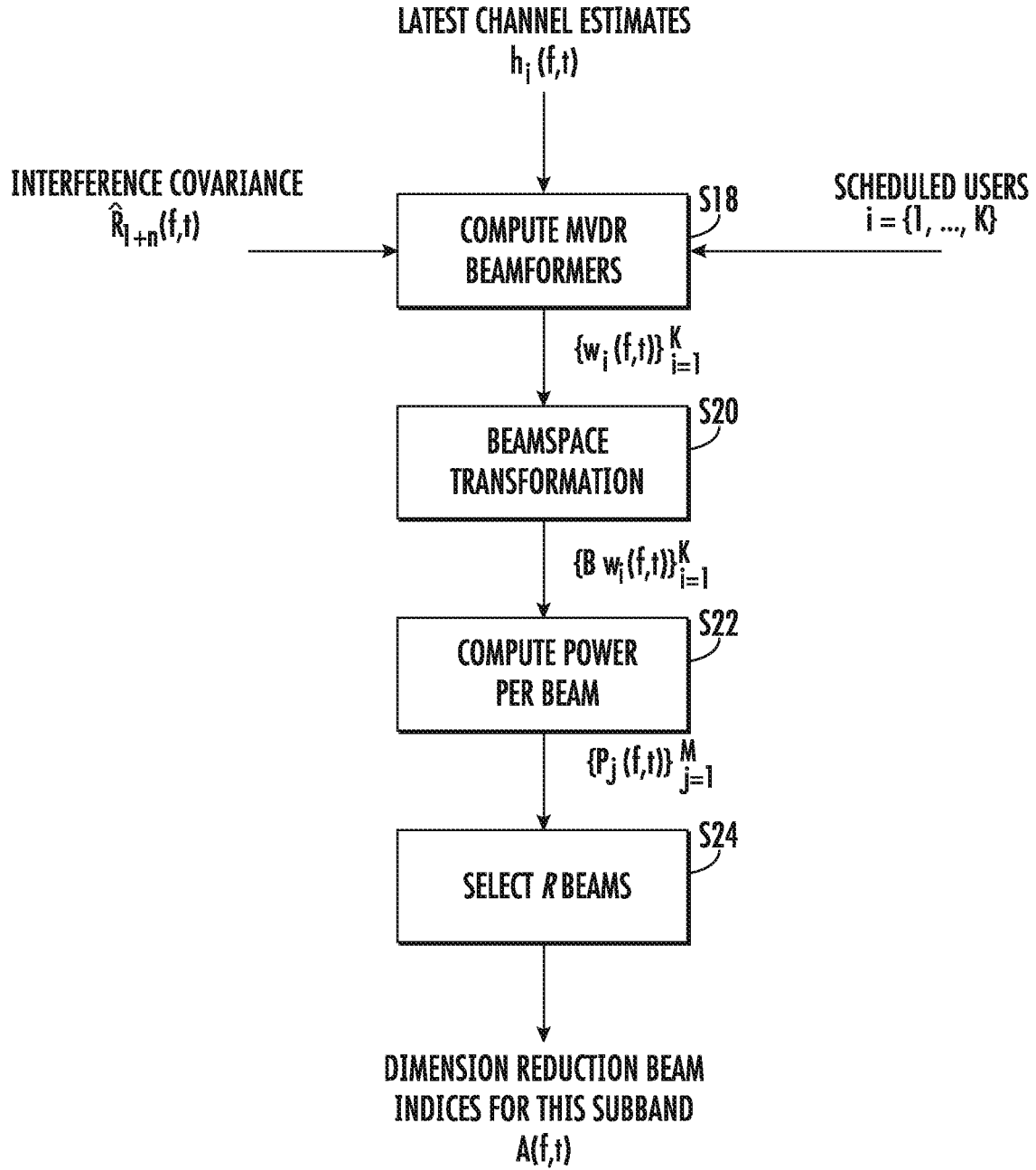
FIG. 6 is a flowchart of an example subband process for interference-aware reduction via orthonormal basis selection according to principles set forth herein.

FIG. 6 shows an example block diagram of an example dimension reduction algorithm according to principles set forth herein. Let $$\hat{h}_i(f, t)$$

denote the available estimate of the channel $h_i(f,t)$. Furthermore, let $\hat{R}_{I+n}(f,t)$ denote the estimate of the M×M covariance matrix $R_{I+n}(f,t)$ of the interference-plus-noise on frequency f at time instant t, i.e., $R_{I+n}(f,t)=E\{I(f,t)I^H(f,t)\}+E\{n (f,t)n^H(f,t)\}$, and $E\{\bullet\}$ denotes the statistical expectation operator. The algorithm starts by calculating, via the beamformer circuitry 63 and/or the processing circuitry 68, the optimal single-user receive beamformers (Block S18) that maximize the output signal to interference-plus-noise ratio (SINR), for each of the scheduled users in the current time-frequency slot. The calculated beamformer for user i is given by the M×1 vector $w_i(f,t)$ is given by the solution of the following problem:

$$w_i(f, t) = \arg\max_{v_i} \frac{|v_i^H \hat{h}_i(f, t)|^2}{v_i^H \hat{R}_{I+n}(f, t)v_i} \text{ subject to } \|w_i(f, t)\| = 1.$$

The solution to the above problem is given by $$w_i(f, t) = \frac{1}{\alpha_i(f, t)}\hat{R}_{I+n}^{-1}(f, t)\hat{h}_i(f, t)$$

where $\alpha_i(f,t)$ is a normalization scalar that is selected such that $\|w_i(f,t)\|=1$.

The beamformers $w_i(f,t)$ may be stored in the memory 72, for example. In some embodiments, the beamformers $w_i(f,t)$ are calculated by the processing circuitry 68 and applied to signals by the beamformer circuitry 63.

Given the allocated users {1, . . . , K} on frequency f at time t, for each scheduled WD i∈{1, . . . , K}, the calculated beamformer $w_i(f,t)$ is transformed to beamspace (Block S20) and the total power in each beam is calculated (Block S22) by summing the power in each transformed channel over all the scheduled users, i.e., compute the total power in each basis vector for all the receive beamformers of the scheduled WDs. Let $b_j$ denote the 1×M vector corresponding to row j of the matrix B. The total power contained in j-th beam can be computed as $$p_j(f, t) = \frac{1}{K}\sum_{i=1}^{K}|b_j w_i(f, t)|^2$$

where $|\bullet|^2$ denotes the squared magnitude of a complex number. Note that $$\sum_{j=1}^{M} p_j(f, t) = 1$$

due to normalization of the norm of the vectors $w_i(f,t)$ and orthonormality of the matrix B.

The total power for all the beams $$\{p_j(f, t)\}_{j=1}^{M},$$

is utilized in selecting the dimension reduction basis (Block S24) from the rows of the Beam space transformation matrix B. Let A(f,t) denote the set of active dimension reduction bases selected for frequency f at time t, i.e., the set containing the indices of the selected rows of the matrix B. Several methods are disclosed for selecting the dimension reduction basis using the computed total power $$\{p_j(f, t)\}_{j=1}^{M}.$$

Note that the number of selected dimension reduction basis, R(f), can be different for different subbands. Some embodiments may include:

1. Fixed Number of Active Beams Method

Select R(f) bases that yield the maximum total power $\Sigma_{j\in A(f,t)}p_j(f,t)$ where the number of elements of the set A(f,t) is equal to R(f), i.e., |A(f,t)|=R(f).

2. Collected Power in Active Beams Method

In this method, select the minimum number of beams that have a total power greater than a fraction β(f) of the total power, i.e., the set of active beams is the solution to the following optimization problem $$\min\left|A(f, t)\right| \text{ s.t. } \sum_{j\in A(f,t)} p_j(f, t) > \beta(f).$$

3. Threshold Based Beam Activation Method

Select the beams that have power greater than a threshold γ(f) of the total beam power, i.e., the set of selected active beams is given by $$A(f, t) = \{j \mid p_j(f, t) > \gamma(f)\}.$$

The dimension reduction matrix T(f,t) is constructed by stacking the rows of the matrix B given by the indices in the set A(f,t).

In order to reduce the computational complexity of calculating the dimension reduction basis, the same basis can be used for all the subbands. In this case, the max-SINR single-user wideband beamformer for user i is calculated as $$\hat{v}_i(t) = \arg\max_{v_i} \frac{v_i^H \hat{R}_{i,S}(t) v_i}{v_i^H \hat{R}_{I+n}(t) v_i} = \rho\{\hat{R}_{I+n}^{-1}(t) \hat{R}_{i,S}(t)\}$$

where $\hat{R}_{I+n}(t) = \Sigma_f \hat{R}_{I+n}(f,t)$ is the wideband interference covariance, $$\hat{R}_{i,S}(t) = \Sigma_f \hat{h}_i(f, t) \hat{h}_i^H(f, t)$$

is the signal covariance matrix, and $\rho\{X\}$ is the principal eigen vector of the matrix X.

Figure 7:
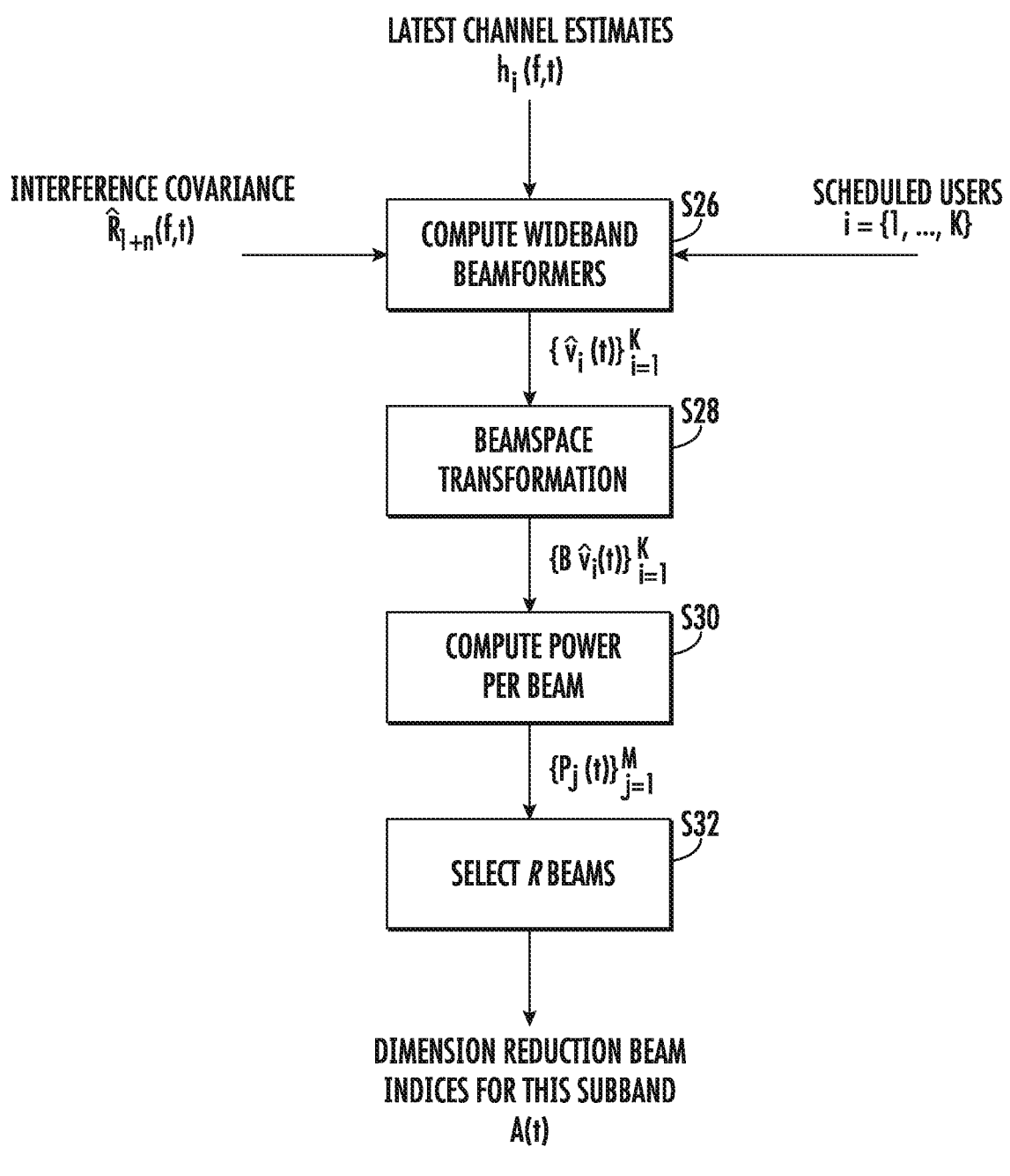
FIG. 7 is a flowchart of an example wideband process for interference-aware reduction via orthonormal basis selection according to principles set forth herein.

FIG. 7 shows a block diagram of a wideband dimension reduction calculation algorithm according to principles set forth herein. Similar to the per-subband Beam space reduction algorithm, the wideband algorithm can be summarized in the following steps:

Compute the N×K matrix $\hat{V}=[\hat{v}_0 \ldots \hat{v}_{K-1}]$ containing the wideband beamformers for the uplink scheduled WDs (Block S26);

Compute the N×K Beamspace beamforming matrix as $\bar{V}=B\hat{V}$ (Block S28);

Compute the wideband beamforming power by summing the squared magnitude of the elements in each row of $\bar{V}$ (Block S30);

Select the set of active dimension reduction basis A(t) using any of the three methods discussed above in the previous section (Block S32); AND Construct the dimension reduction matrix for the whole band from the rows of the beam space transformation matrix B corresponding to the indices in A(t).

Note that the complexity of the wideband dimension reduction algorithm is much lower than that of the per-subband algorithm as the beamformers are computed only once for the whole uplink transmission bandwidth.

The performance of the beam reduction technique is illustrated using numerical simulations. A time division duplex (TDD) system is simulated with a bandwidth of 100 MHz and carrier frequency of 3.5 GHz. We consider a multicell deployment simulation with 7 sites and 3 cells/site where the inter-site distance is 500 m. The WDs are dropped randomly in the simulation area. The 5G spatially correlated model (SCM) Urban Macro channel model with non-line of sight (NLOS) communication is used. The antenna configuration at the base station is the active antenna system (AAS) 4×8×2 configuration. The traffic model for the uplink is selected as full buffer while the downlink has no traffic. The channel estimates are obtained using a full band sounding reference symbol which is transmitted by the WD every 10 msec. The interference covariance matrix is estimated by listening to sounding transmissions from out-of-cell WDs. Uplink multi-user MIMO is implemented in the uplink where a maximum of 8 layers can be simultaneously transmitted by the WDs in each resource block. The base station uses the uplink channel estimate (after beam reduction) to compute the minimum mean square error (MMSE) receiver for the scheduled WD in the uplink.

The performance of the interference-aware beam reduction algorithms disclosed herein is compared with the power-based beam reduction that utilizes only the channel estimates of the co-scheduled WDs to select the dimension reduction basis, i.e., assuming $R_{I+n}(f,t)=I_M$.

Figure 8:
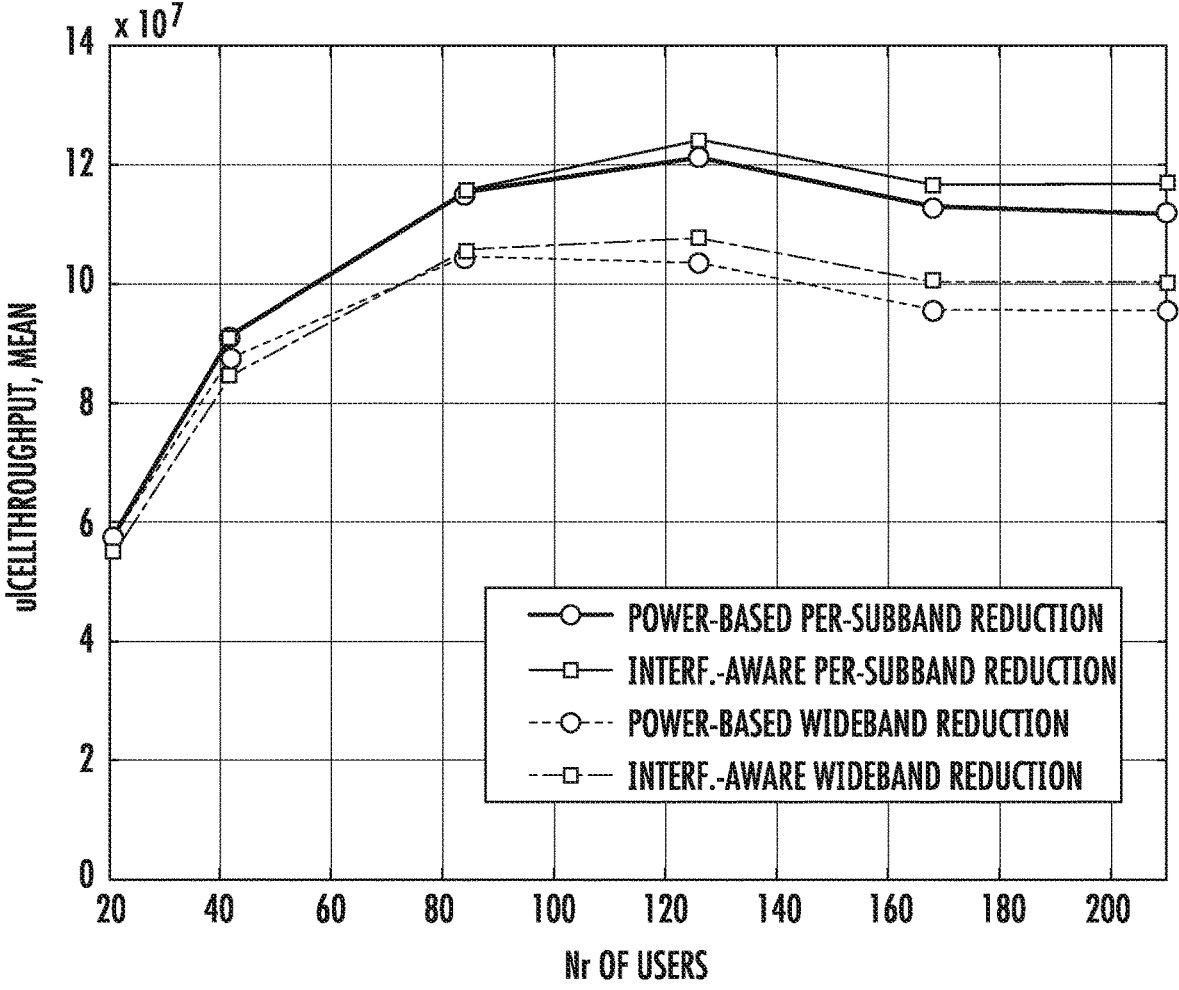
FIG. 8 is a graph of per band and wideband interference-aware reduction mean throughput versus number of users for an example embodiment.

FIG. 8 shows the average uplink cell throughput versus the number of WDs in the simulation area (21 cells). FIG. 8 shows that the interference-aware dimension reduction algorithm can improve the downlink cell throughput when the number of active users is large, i.e., when the system is heavily loaded. In this case, out-of-cell interference causes large degradation in the system throughput, and hence, the interference-aware dimension reduction algorithm can significantly improve the system performance. FIG. 8 also shows that per-subband dimension reduction yields improvements over wideband dimension reduction as the basis is selected for each subband independently, and hence, more degrees of freedom are available for interference suppression.

Some embodiments use additional information about out-of-cell interference in designing dimension reduction transformations that not only focus the desired signal power in the reduced dimensions but also reduces the interference power. This is achieved by using the optimal receive beamformer for each user that maximizes the output SINR to select the dimension reduction basis from a set of fixed basis vectors.

According to one aspect, a method in a network node 16 configured to perform interference-aware dimension reduction is provided. The method includes determining, via the beamformer 66, a beamformer for each of a plurality of wireless devices, WDs 22, each beamformer being based at least in part on an interference covariance matrix of interference plus noise. The method includes determining, via the processing circuitry 68, a power in each dimension reduction basis vector of a plurality of dimension reduction basis vectors based at least in part on the determined beamformers. The method further includes selecting, via the processing circuitry 68, a subset of the dimension reduction basis vectors, the selecting being based at least in part on the determined powers, a number of selected dimension reduction basis vectors being less than a number of antenna elements of the network node 16. The method also includes multiplying, via the processing circuitry 68, a received signal vector by a dimension reduction matrix, the received signal vector having a dimension equal to the number of antenna elements of the network node 16, the dimension reduction matrix having as rows the selected subset of the dimension reduction basis vectors, the multiplying resulting in a reduced signal vector having a dimension equal to the number of selected rows of the dimension reduction matrix.

According to this aspect, in some embodiments, the dimension reduction basis vectors are selected from the columns of a spatial discrete Fourier transform matrix. In some embodiments, the method includes processing and decoding, via the processing circuitry 68, the reduced signal vector to extract information received from each WD 22 of the plurality of WDs 22. In some embodiments, the beamformer for a WD 22 is determined based at least in part on a product of an inverse of the interference covariance matrix and a channel vector corresponding to a channel between the WD 22 and the network node 16. In some embodiments, the beamformer for a WD 22 is determined based at least in part on a generalized eigen value decomposition of the interference covariance matrix and the covariance matrix of the channel between the WD 22 and the network node 16. In some embodiments, selecting the dimension reduction basis vectors includes selecting the dimension reduction basis vectors that yield a higher total power than any other set having the same number of dimension reduction basis vectors. In some embodiments, selecting the dimension reduction basis vectors includes selecting the dimension reduction basis vectors corresponding to a minimum number of dimension reduction basis vectors having a total power greater than a predetermined fraction of the total power in all the basis vectors. In some embodiments, selecting the dimension reduction basis vectors includes selecting dimension reduction basis vectors each having a power greater than a threshold. In some embodiments, the interference covariance matrix is determined for each sub band of a plurality of sub bands. In some embodiments, determining a power in each dimension reduction basis vector is based at least in part on an inner product between the determined beamformers and the dimension reduction basis vector. In some embodiments, the plurality of WDs 22 are co-scheduled in time and frequency.

According to another aspect, a network node 16 is configured to perform interference-aware dimension reduction. The network node 16 includes processing circuitry 68 configured to determine a beamformer for each of a plurality of wireless devices, WDs 22, each beamformer being based at least in part on an interference covariance matrix of interference plus noise; determine a power in each dimension reduction basis vector of a plurality of dimension reduction basis vectors based at least in part on the determined beamformers; select a subset of the dimension reduction basis vectors, the selecting being based at least in part on the determined powers, a number of selected dimension reduction basis vectors being less than a number of antenna elements of the network node 16; and multiply a received signal vector by a dimension reduction matrix, the received signal vector having a dimension equal to the number of antenna elements of the network node 16, the dimension reduction matrix having as rows the selected subset of the dimension reduction basis vectors, the multiplying resulting in a reduced signal vector having a dimension equal to the number of selected rows of the dimension reduction matrix.

According to this aspect, in some embodiments, the dimension reduction basis vectors are selected from the columns of a spatial discrete Fourier transform matrix. In some embodiments, the processing circuitry 68 is further configured to decode the reduced signal vector to extract information received from each WD 22 of the plurality of WDs 22. In some embodiments, the beamformer for a WD 22 is determined based at least in part on a product of an inverse of the interference covariance matrix and a channel vector corresponding to a channel between the WD 22 and the network node 16. In some embodiments, the beamformer for a WD 22 is determined based at least in part on a generalized eigen value decomposition of the interference covariance matrix and the covariance matrix of the channel between the WD 22 and the network node 16. In some embodiments, selecting the dimension reduction basis vectors includes selecting the dimension reduction basis vectors that yield a higher total power than any other set having the same number of dimension reduction basis vectors. In some embodiments, selecting the dimension reduction basis vectors includes selecting the dimension reduction basis vectors corresponding to a minimum number of dimension reduction basis vectors having a total power greater than a predetermined fraction of the total power in all the basis vectors. In some embodiments, selecting the dimension reduction basis vectors includes selecting dimension reduction basis vectors each having a power greater than a threshold. In some embodiments, the interference covariance matrix is determined for each sub band of a plurality of sub bands. In some embodiments, determining a power in each dimension reduction basis vector is based at least in part on an inner product between the determined beamformers and the dimension reduction basis vector.

According to another aspect, a computer program is configured to cause a processor 70 to perform any of the methods disclosed herein.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Some abbreviations used herein are defined as follows.

| Abbreviation | Explanation |
| --- | --- |
| AAS | Active Antenna System |
| MIMO | Multiple Input Multiple Output |
| MMSE | Minimum Mean Square Error |
| NLOS | Non-Line of Sight |
| SCM | Spatial Correlation Model |
| S-DFT | Spatial Discrete Fourier Transform |
| SINR | Signal to Interference-plus-Noise Ratio |
| TDD | Time Division Duplex |
| UE | User Equipment |
| WD | Wireless Device |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a network node configured to perform interference-aware dimension reduction, the method comprising:

determining a beamformer for each of a plurality of wireless devices, WDs, each beamformer being based at least in part on an interference covariance matrix of interference plus noise;

determining a power in each dimension reduction basis vector of a plurality of dimension reduction basis vectors based at least in part on the determined beamformers;

selecting a subset of the dimension reduction basis vectors, the selecting being based at least in part on the determined powers, a number of selected dimension reduction basis vectors being less than a number of antenna elements of the network node; and multiplying a received signal vector by a dimension reduction matrix, the received signal vector having a dimension equal to the number of antenna elements of the network node, the dimension reduction matrix having as rows the selected subset of the dimension reduction basis vectors, the multiplying resulting in a reduced signal vector having a dimension equal to the number of selected rows of the dimension reduction matrix.

2. The method of claim 1, wherein the dimension reduction basis vectors are selected from the columns of a spatial discrete Fourier transform matrix.

3. The method of claim 1, further comprising processing and decoding the reduced signal vector to extract information received from each WD of the plurality of WDs.

4. The method of claim 1, wherein the beamformer for a WD is determined based at least in part on a product of an inverse of the interference covariance matrix and a channel vector corresponding to a channel between the WD and the network node.

5. The method of claim 1, wherein the beamformer for a WD is determined based at least in part on a generalized eigen value decomposition of the interference covariance matrix and the covariance matrix of the channel between the WD and the network node.

6. The method of claim 1, wherein selecting the dimension reduction basis vectors includes selecting the dimension reduction basis vectors that yield a higher total power than any other set having the same number of dimension reduction basis vectors.

7. The method of claim 1, wherein selecting the dimension reduction basis vectors includes selecting the dimension reduction basis vectors corresponding to a minimum number of dimension reduction basis vectors having a total power greater than a predetermined fraction of the total power in all the basis vectors.

8. The method of claim 1, wherein selecting the dimension reduction basis vectors includes selecting dimension reduction basis vectors each having a power greater than a threshold.

9. The method of claim 1, wherein the interference covariance matrix is determined for each sub band of a plurality of sub bands.

10. The method of claim 1, wherein determining a power in each dimension reduction basis vector is based at least in part on an inner product between the determined beamformers and the dimension reduction basis vector.

11. The method of claim 1, wherein the plurality of WDs are co-scheduled in time and frequency.

12. A network node configured to perform interference-aware dimension reduction, the network node comprising processing circuitry configured to:

determine a beamformer for each of a plurality of wireless devices, WDs, each beamformer being based at least in part on an interference covariance matrix of interference plus noise;

determine a power in each dimension reduction basis vector of a plurality of dimension reduction basis vectors based at least in part on the determined beamformers;

select a subset of the dimension reduction basis vectors, the selecting being based at least in part on the determined powers, a number of selected dimension reduction basis vectors being less than a number of antenna elements of the network node; and multiply a received signal vector by a dimension reduction matrix, the received signal vector having a dimension equal to the number of antenna elements of the network node, the dimension reduction matrix having as rows the selected subset of the dimension reduction basis vectors, the multiplying resulting in a reduced signal vector having a dimension equal to the number of selected rows of the dimension reduction matrix.

13. The network node of claim 12, wherein the dimension reduction basis vectors are selected from the columns of a spatial discrete Fourier transform matrix.

14. The network node of claim 12, wherein the processing circuitry is further configured to decode the reduced signal vector to extract information received from each WD of the plurality of WDs.

15. The network node claim 12, wherein the beamformer for a WD is determined based at least in part on a product of an inverse of the interference covariance matrix and a channel vector corresponding to a channel between the WD and the network node.

16. The network node of claim 12, wherein the beamformer for a WD is determined based at least in part on a generalized eigen value decomposition of the interference covariance matrix and the covariance matrix of the channel between the WD and the network node.

17. The network node of claim 12, wherein selecting the dimension reduction basis vectors includes selecting the dimension reduction basis vectors that yield a higher total power than any other set having the same number of dimension reduction basis vectors.

18. The network node of claim 12, wherein selecting the dimension reduction basis vectors includes selecting the dimension reduction basis vectors corresponding to a minimum number of dimension reduction basis vectors having a total power greater than a predetermined fraction of the total power in all the basis vectors.

19. The network node of claim 12, wherein selecting the dimension reduction basis vectors includes selecting dimension reduction basis vectors each having a power greater than a threshold.

20. The network node of claim 12, wherein the interference covariance matrix is determined for each sub band of a plurality of sub bands.

21. The network node of claim 12, wherein determining a power in each dimension reduction basis vector is based at least in part on an inner product between the determined beamformers and the dimension reduction basis vector.

22. A non-transitory computer storage medium storing thereon a computer program configured to perform a method when executed, the method comprising:

determining a beamformer for each of a plurality of wireless devices, WDs, each beamformer being based at least in part on an interference covariance matrix of interference plus noise;

determining a power in each dimension reduction basis vector of a plurality of dimension reduction basis vectors based at least in part on the determined beamformers;

selecting a subset of the dimension reduction basis vectors, the selecting being based at least in part on the determined powers, a number of selected dimension reduction basis vectors being less than a number of antenna elements of the network node; and multiplying a received signal vector by a dimension reduction matrix, the received signal vector having a dimension equal to the number of antenna elements of the network node, the dimension reduction matrix having as rows the selected subset of the dimension reduction basis vectors, the multiplying resulting in a reduced signal vector having a dimension equal to the number of selected rows of the dimension reduction matrix.

* * * * *